Jan. 17, 1928.

E. H. PATCHIN 1,656,227

RECORDING DEVICE AND METHOD OF USING THE SAME

Filed Sept. 11, 1926

Inventor
ELNO H. PATCHIN

By Paul, Paul & Moore
ATTORNEYS

Patented Jan. 17, 1928.

1,656,227

UNITED STATES PATENT OFFICE.

ELNO H. PATCHIN, OF MINNEAPOLIS, MINNESOTA.

RECORDING DEVICE AND METHOD OF USING THE SAME.

Application filed September 11, 1926. Serial No. 134,865.

The invention relates to a checkup or recording device and manner of using the same, objects of the invention being to provide a checkup device and checkup system for determining the number of miles traveled, for example, by an automobile, between oiling and greasing periods. The device provides an arrangement for separately recording the reading of an odometer, and maintaining such a record-reading for subsequent comparison with the total mileage readings of the odometer. For example, suppose that one wishes to have the car oiled and greased after each five hundred miles of travel. The recorder is set to correspond with whatever the total mileage reading of the odometer may be at the time. Thereafter, as the odometer registers additional mileage, a comparison may always be had, so that difference between the readings at any given moment will show the miles traveled since setting the recording device, and when this difference is shown to be, in this instance, five hundred miles, oiling and greasing is in order.

Features of the invention include the use and arrangement of the checkup device adjacent the odometer, as well as the details of construction of the recorder or checkup device per se.

Another object is to provide a recording device, the recording elements of which are adapted to be set and to be locked in set position, by a key-operable means, to prevent change of the setting except by authorized persons.

Other objects and advantages will be set forth in the description forming part of this specification and in said drawings.

Figure 1:
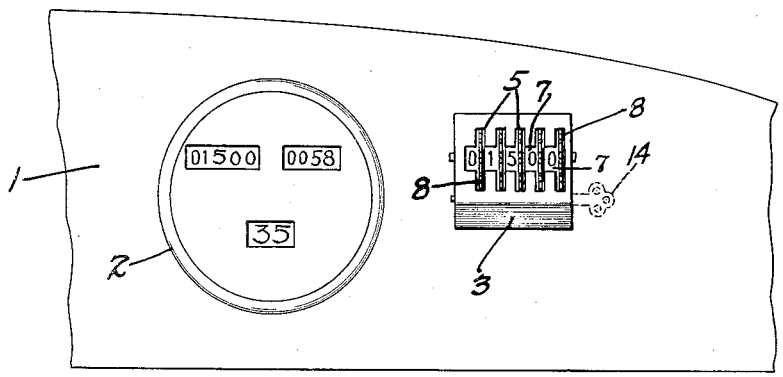
Figure 1 is a face view of an instrument board or cowl, showing my recording device arranged adjacent an odometer.

Numeral 1 designates the cowl or instrument board, 2 the odometer, and 3 the casing of the recording device, attached as by bolts 4. The casing is provided in its forward side with a series of slots 5. Within the casing, a shaft 6 is arranged lengthwise and suitably supported in the end walls of the casing. Upon this shaft, are rotatably arranged a series of disks 7 each having a peripherally notched plate 8 attached at its side. The disks have peripherally arranged numerals, and the number of notches of the plates correspond to the number of numerals, and spacing of the same. The plates are concentric with the axis of rotation of the disks and project through the slots 5 for engagement, by the fingers, to rotate and set the same. A flat spring 10, as a detent, is arranged to engage the notches of each plate to yieldably hold the disks in adjusted position, and each plate after adjustment is held by its corresponding spring until all plates are locked against further adjustment by a latch, now to be described.

Figures 2, 3:
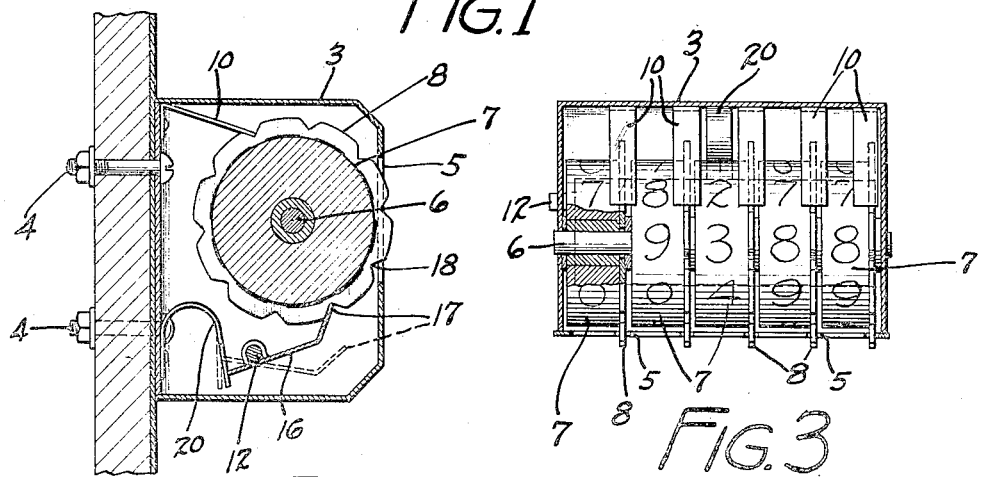
Figure 2 is a vertical section of the recording device.
Figure 3 is a top plan with portions of the device broken away.
Figure 4:
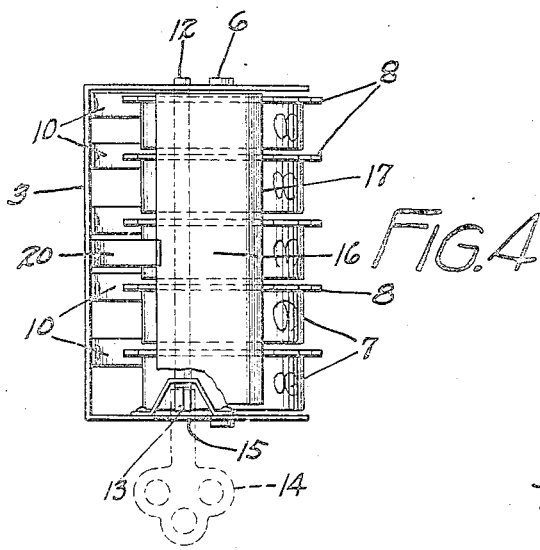
Figure 4 is a bottom view illustrating the arrangement of the lock plate.

A latch shaft 12 is arranged in parallel relation to the first mentioned shaft and at that side opposite the detents. This shaft has a squared end 13 lying within the casing, and adapted for engagement by a key 14, through an opening 15. Upon the shaft is mounted a plate 16 having an edge 17 arranged for engagement with the notches 18, when the notches of all plates are aligned. A spring 20 is suitably attached within the casing, and has one end engaged with one edge of the plate, frictionally, to yieldably secure the plate either in locked or unlocked position, (see Figure 2).

My method of using the device is as follows:

The odometer reading is noted and then the disks of the recorder are rotated to bring into view that sequence of numbers necessary to duplicate the odometer reading. The disks of the recording device are then locked to maintain the record reading. The odometer record changes with continued travel of the car, but a comparison of the changed readings with the recorder can be had at any time; to show the number of miles traveled since the recorder was set.

I claim as my invention:

1. A casing having therein a series of notched disks rotatably mounted, a shaft within the casing having thereon a stop element movable in one direction to engage aligned notches of the disks to prevent rotation, and a spring abutting one edge of the stop on that side of the shaft opposite its disk-engaging portion in a manner to permit continued edge engagement to secure the stop after a disengaging movement in an opposite direction.

2. A casing having therein a series of notched disks rotatably mounted, a shaft having thereon a stop element movable to engage aligned notches of the disks to prevent rotation, and a spring engaging one edge of the stop in a manner to permit continued edge engagement to secure the stop after a disengaging movement in an opposite direction.

3. A casing having therein a series of notched disks rotatably mounted, a shaft within the casing having thereon a stop element movable to engage aligned notches of the disks to prevent rotation, and a spring engaging the stop in a manner to permit continued engagement to secure the stop after a disengaging movement in an opposite direction, said spring being secured at one end to the casing and having its free end engaging the stop.

4. A casing having therein a series of notched disks rotatably mounted, a shaft within the casing having thereon a stop element movable in one direction to engage aligned notches of the disks to prevent rotation, and a spring engaging one edge of the stop on that side of the shaft opposite its disk engaging portion in a manner to permit continued edge engagement to secure the stop after a disengaging movement in an opposite direction, said spring being secured at one end to the casing and having its free end engaging the stop, said shaft having an end lying within the casing the end being formed to permit the shaft to be turned by a key inserted through an opening in the casing.

In witness whereof, I have hereunto set my hand this 4th day of September, 1926.

ELNO H. PATCHIN.